United States Patent [19]

McDonald

[11] 4,023,355
[45] May 17, 1977

[54] COMBINATION DIFFUSER, THERMAL BARRIER, AND INTERCHAMBER VALVE FOR ROCKETS

[75] Inventor: Allan J. McDonald, Brigham City, Utah

[73] Assignee: Thiokol Corporation, Newtown, Pa.

[22] Filed: Feb. 24, 1972

[21] Appl. No.: 228,935

[52] U.S. Cl. .............................. 60/254; 60/39.82 E; 60/256; 137/625.33; 251/63.5
[51] Int. Cl. .............................................. F02k 9/04
[58] Field of Search .......... 137/625.33, 627.5, 628; 60/254, 256; 251/63, 63.5

[56] References Cited
UNITED STATES PATENTS 3,065,597  11/1962  Adamson et al. ............... 60/254 X
3,102,386   9/1963  Proell .............................. 60/254 X Primary Examiner—Carlton R. Croyle
Assistant Examiner—Robert E. Garrett
Attorney, Agent, or Firm—Stanley A. Marcus; Edward E. McCullough; William R. Wright, Jr.

[57] ABSTRACT

A heavily insulated, hydraulically actuated, compound poppet valve is positioned in a main gas stream between a gas generator and a rocket motor so that the gases must flow around it and be diffused thereby. It is also capable of selectively valving a variety of ports from the gas generator into the rocket motor to achieve desired ignition effects; and it can turn off flow completely between the two motors and prevent excessive heat from the rocket motor from entering the gas generator.

5 Claims, 1 Drawing Figure

U.S. Patent   May 17, 1977   4,023,355
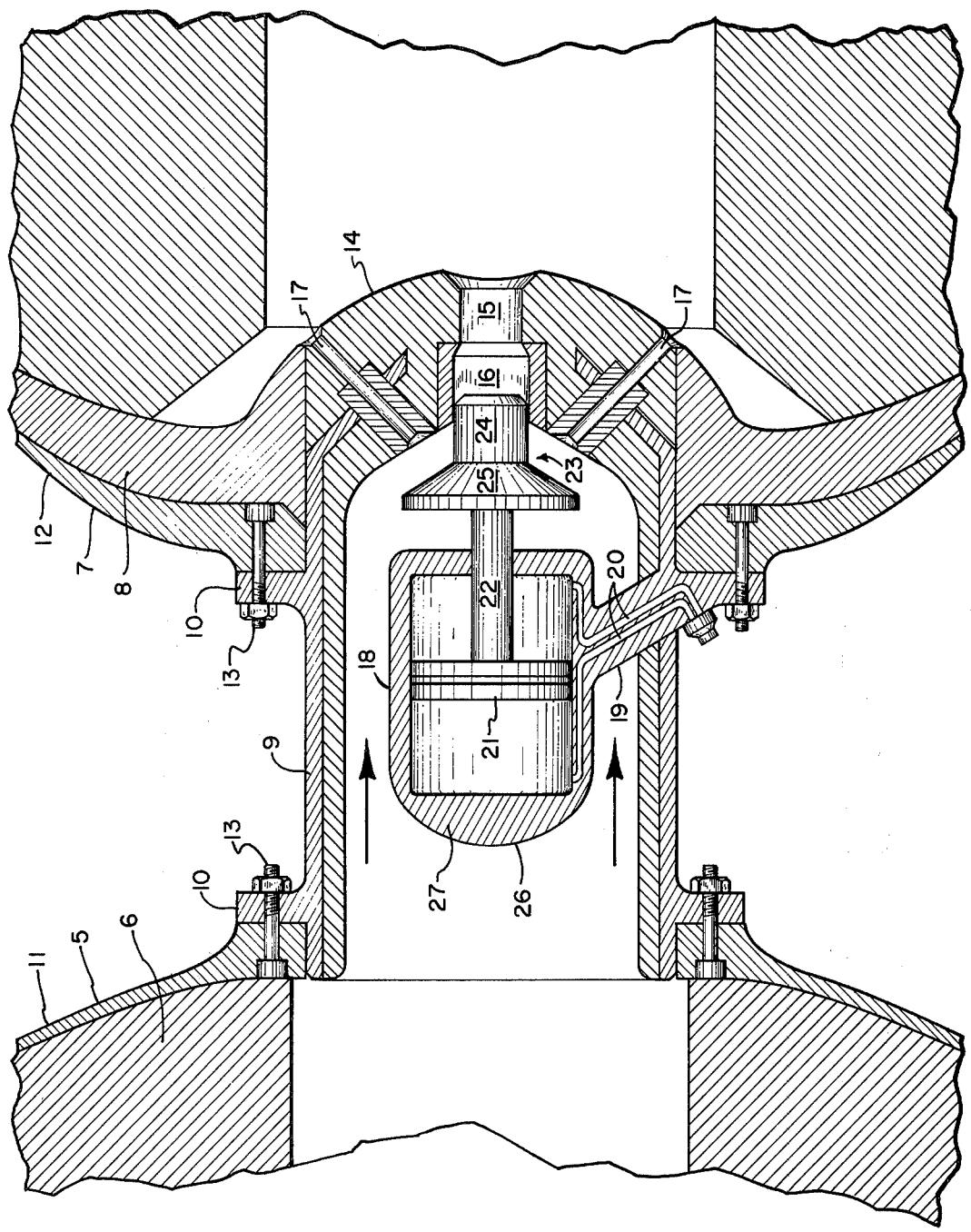

COMBINATION DIFFUSER, THERMAL BARRIER, AND INTERCHAMBER VALVE FOR ROCKETS

BACKGROUND OF THE INVENTION

This invention relates to rockets, and particularly to solid propellant rockets of the controllable types wherein gases from a gas generator must be valved into a propulsion motor selectively for a variety of purposes. The invention herein described was made in the course of or under a contract with the U.S. Air Force.

One of the most promising methods of imparting start and stop capability to solid propellant rockets and to vary the velocity thereof in flight is to connect a rocket motor that is capable of being extinguished to a gas generator. Gases from the gas generator may then be used to reignite the propulsion motor after it has been extinguished, or it may be used to augment the thrust of the propulsion motor by adding its gases thereto.

However, valving of gases from a gas generator to a propulsion motor has involved a number of difficulties: (1) erratic jets of gas may erode the propellant of the propulsion motor in undesirable ways to produce unwanted or excessive burning surfaces therein; (2) it may set up dangerous oscillations in the primary motor; and (3) hot gases from the primary motor may invade the gas generator after ignition thereof.

SUMMARY OF THE INVENTION

The present invention, which overcomes these difficulties, is essentially a specially formed hydraulic actuator with a poppet valve member fixed to the actuation arm thereof. The actuator, which is double acting, is positioned by a support member in the center of the main gas flow from a gas generator to a propulsion rocket motor. The forward end of the hydraulic actuator has an aerodynamic shape so it may function as a gas diffuser to break up any high velocity gas jets that may exist in the gas flow. The support member serves also as a conduit for hydraulic lines to the double acting hydraulic actuator. The poppet valve member, operated by the hydraulic actuator, is a compound structure that may selectively open and close an axial orifice or a plurality of smaller, canted, radial orifices; so that the pattern of flame impingement on the propellant of the propulsion motor may be controlled as desired.

The double acting hydraulic actuator and poppet valve, being axially situated between the gas generator and the propulsion motor, may also act as a thermal barrier between them to prevent high energy gases of the propulsion motor from entering the gas generator after ignition of the former.

Objects of the invention are: (1) to provide a valve means between a gas generator and a propulsion rocket motor that may control the flame pattern of gases from the gas generator as they impinge on the surface of te propellant grain of the propulsion motor; (2) to provide such an apparatus that may diffuse the gas generator gases before they enter the propulsion motor; and (3) to provide a thermal barrier between the gas generator and the propulsion motor. Important features of the invention are its simplicity of construction, involving only one moving part, and its resultant reliability.

Other objects and features of the invention will become apparent as the following detailed description is read with reference to the accompanying drawing.

BRIEF DESCRIPTION OF THE DRAWING

In the drawing:

The FIGURE is a longitudinal sectional view of the invention, showing only adjacent portions of the gas generator and the propulsion rocket motor.

DESCRIPTION OF THE PREFERRED EMBODIMENTS

The FIGURE illustrates the juncture between a gas generator 5 having a solid propellant 6 therein and a rocket mortor 7 having a solid propellant 8. The juncture itself is formed by a short pipe 9 equipped with flanges 10 that are fixed to the aft closure dome 11 of the gas generator 5 and the forward closure 12 of the propulsion motor 7, respectively, by screws 13.

As shown in the FIGURE, the juncture pipe 9 is actually an integral part of the forward closure 12 of the propulsion motor 7. The juncture of the pipe 9 with the forward closure 12 of the propulsion motor is a concavo-convex structure 14 equipped with a relatively large central orifice 15 having a valve seat 16 on the gas generator side thereof. The inlet and outlet sides of this orifice 15 are beveled to provide a venturi to accelerate gases passing therethrough.

A plurality of smaller, canted, radially oriented orifices 17 surround the central orifice 15. The orifices 17 are also equipped with beveled inlet and outlet ends to provide venturi effects for accelerating gases passing therethrough.

A double acting, hydraulic actuator 18 is centrally positioned in the pipe 9 by a support member 19 fixed to the pipe, which also functions as a conduit for hydraulic lines 20 whereby the hydraulic actuator 19 is operated. The actuator 18 has a piston 21 and an actuating arm 22 attached thereto. A compound poppet valve member 23 is fixed to the outer end of the actuating arm 22. This valve member 23 is composed of two parts. A cylindrical portion 24 fits into the valve seat 16 of the central orifice 15; and a conical member 25, surrounding the base of the cylindrical member 24, is shaped to fit the forward, concave conical surface of the structure 14, so that it may open or close the smaller orifices 17. The cylindrical portion 24 and the conical portion 25 of the valve member 23 are shaped so that they open and close the central orifice 15 and the radial orifices 17 serially. As the valve member 23 is moved aftward, the central orifice 15 is closed first, and, as this member is moved forward, the radial orifices 17 are opened first. This permits selectivity among three choices: (1) all orifices may be simultaneously opend; (2) the central orifice may be closed and the radial orifices opened; or (3) all orifices may be closed.

The forward end of the actuator 18 has an aerodynamic dome 26 that functions as a diffuser to diffuse the hot gases coming from the gas generator 5 and to break up any high velocity jets that may be contained therein, that may carve gouges or other undesirable erosion patterns in the propellant grain of the propulsion motor 7.

In operation, the propulsion motor 7 is typically of the extinguishable type, so that the velocity of the missile may be controlled. Extinguishable, solid propellant rocket motors are known in the art, and are not a part of the present invention. When the propulsion motor 7 is ignited for the first time, the burning surface of the propellant is relatively close to the central orifice and, hence, it is desirable that all orifices be opened simultaneously for such ignition. However, on subsequent re-ignitions, the propellant surface is farther away from the central orifice 15 and, hence, it is more effectively ignited if only the radial orifices 17 are opened, so that the full force of gases from the gas generator 5 is directed outwardly from the central orifice 15. Sometimes, it is desirable to increase the thrust of the entire missile by adding gases from the gas generator 5 to those of the propulsion motor 7. In this case, it is desirable that all orifices be opened simultaneously.

The actuator 18 is heavily insulated with a layer of thermal insulation 27, and the actuation arm 22 and its valve member 23 are made of some refractory material such as tungsten or dense graphite, to withstand the high temperature gases.

An invention has been described that constitutes an advance in the art of controllable, solid propellant rockets. Although the preferred embodiment has been described with considerable specificity with regard to detail, it should be noted that many such details may be altered without departing from the scope of the invention as it is defined in the following claims.

The invention claimed is:

1. A combined diffuser, thermal barrier, and interchamber valve for metering gases as desired from a gas generator, having an apertured aft closure, into a solid propellant rocket motor, having an apertured forward closure, comprising:

a pipe having one closed end with a central orifice and a plurality of canted, radially-oriented orifices in the closed end, the orifices also being equipped with valve seats on their inlet ends;

a double acting, hydraulic actuator positioned centrally in the pipe and having a piston with an actuation arm attached thereto;

a support member fixed at one end to the actuator and at the other end to the pipe;

a compound poppet valve member fixed to the actuating arm of the actuator, comprising a first valve member that fits into the valve seat of the central orifice of the pipe and a second valve member that may open and close the radial orifices, the first valve member being somewhat elongated so that, as the poppet valve member is moved aftward, the central orifice will be closed first and so that the radial orifices will be opened first as it is moved forward; and means on the pipe for attaching it at one end to the gas generator and at the other end to the rocket motor.

2. The apparatus of claim 1 wherein the orifices in the closed end of the pipe are beveled at their ends to form venturis.

3. The apparatus of claim 1 wherein the forward end of the actuator has an aerodynamic surface to function as a diffuser for diffusing gases that may flow through the pipe.

4. The apparatus of claim 1 wherein the support member is hollow and contains hydraulic lines to the interior of the actuator.

5. A combined diffuser, thermal barrier, and interchamber valve for joining the apertured aft closure of a gas generator to the apertured forward closure of a solid propellant rocket motor, comprising;

a pipe having a concavo-convex structure closing one end thereof, the inner surface of the structure being a concave cone, with a central orifice therein and canted, radial orifices surrounding it, the central orifice also being equipped with a valve seat at its inlet end;

a double acting hydraulic actuator having an aerodynamic dome on its forward end, a piston therein, and an actuation arm attached to the piston;

a hollow support fixed at one end to the actuator and the other end to the pipe for supporting the actuator therein;

a compound poppet valve member fixed to the actuation arm and comprising a cylindrical member that fits into the valve seat of the central orifice and a conical member that fits the conical surface inside the closed end of the pipe so that it may close the inlet ends of the radial orifices; and flanges on the ends of the pipe for attaching it to the gas generator and to the rocket motor.

* * * * *